(12) United States Patent
Miller (10) Patent No.: US 11,170,036 B2
(45) Date of Patent: Nov. 9, 2021

(54) METHODS AND SYSTEMS FOR PERSONALIZED SCREEN CONTENT OPTIMIZATION

(71) Applicant: Rovi Guides, Inc., San Jose, CA (US)

(72) Inventor: Kyle Miller, Durham, NC (US)

(73) Assignee: Rovi Guides, Inc., San Jose, CA (US)

( * ) Notice: Subject to any disclaimer, the term of this patent is extended or adjusted under 35 U.S.C. 154(b) by 176 days.

(21) Appl. No.: 16/454,834

(22) Filed: Jun. 27, 2019

(65) Prior Publication Data
US 2020/0409983 A1 Dec. 31, 2020

(51) Int. Cl.
*G06F 16/435* (2019.01)
*G06F 16/438* (2019.01)
*G06F 16/2457* (2019.01)
*G06F 16/41* (2019.01)

(52) U.S. Cl.
CPC ...... *G06F 16/435* (2019.01); *G06F 16/24578* (2019.01); *G06F 16/41* (2019.01); *G06F 16/438* (2019.01)

(58) Field of Classification Search
None
See application file for complete search history.

(56) References Cited

U.S. PATENT DOCUMENTS

| | | | |
|---|---|---|---|
| 6,388,714 B1 | 5/2002 | Schein | |
| 6,756,997 B1 | 6/2004 | Ward | |
| 7,761,892 B2 | 7/2010 | Ellis | |
| 9,224,105 B2* | 12/2015 | Cornelius | G06F 16/24578 |
| 10,242,381 B1* | 3/2019 | Zappella | G06Q 30/0245 |
| 10,715,869 B1* | 7/2020 | Miller | G06N 3/088 |
| 2012/0016642 A1* | 1/2012 | Li | G06Q 30/02 703/2 |
| 2015/0051973 A1 | 2/2015 | Li | |
| 2015/0095271 A1 | 4/2015 | Ioannidis | |
| 2015/0199715 A1* | 7/2015 | Caron | G06Q 30/0254 705/14.52 |
| 2015/0332372 A1 | 11/2015 | Hariri | |
| 2017/0278114 A1* | 9/2017 | Renders | G06Q 30/0282 |
| 2019/0080009 A1* | 3/2019 | Basu | G06F 16/24578 |
| 2020/0226167 A1* | 7/2020 | Chen | G06F 40/295 |
| 2020/0226168 A1* | 7/2020 | Chen | G06F 16/972 |

OTHER PUBLICATIONS

International Search Report and Written Opinion in PCT/US2020/040163 dated Aug. 17, 2020.

* cited by examiner

*Primary Examiner* — Uyen T Le
(74) *Attorney, Agent, or Firm* — Haley Guiliano LLP (57) ABSTRACT

Systems and associated methods are described for providing content recommendations. The system selects, using a multi-armed bandit solution model, a first plurality of content categories based on a reward score of each content category. The categories are displayed. When a user selects an item from the displayed categories, the system finds all categories that include the selected item, but rewards only the category with the highest score. The system selects, using the multi-armed bandit solution model, the second plurality of content categories based on the updated reward score of each content category. The categories are then displayed. The system may also repeat the steps to refine the multi-armed bandit solution model.

20 Claims, 7 Drawing Sheets

METHODS AND SYSTEMS FOR PERSONALIZED SCREEN CONTENT OPTIMIZATION

BACKGROUND

The present disclosure relates to systems and methods for providing content recommendations, and more particularly to systems and related processes for selecting content categories using a modified the multi-armed bandit solution model.

SUMMARY

Content distribution systems often need to provide media content item recommendations. Often, media content item recommendations are grouped by categories (e.g., as a carousel of content items). Media content distribution systems are commonly unable to display all available content categories due to limited size of the user interface. In one approach, the categories that are to be displayed are hand-picked by a human curator. However, this approach is burdensome and does not guarantee that the most relevant content categories will be displayed for each user. In another approach, the content distribution systems use simple A/B testing to identify the most promising categories. However, the A/B testing approach is time-consuming and often results in the selection of similar categories that have a high number of shared content items, which may clutter the user interface with identical content item identifiers and lead to a poor user experience.

To address these shortcomings, systems and methods are described herein that leverage a modified the multi-armed bandit solution model to empirically determine content categories that are most relevant to a user (or a group of users) while maintaining content diversity. To this end, a content recommendation application may use a multi-armed bandit solution model that treats a display of a content category as a resource allocation and attempts to maximize the number of generated views which are treated as a reward function. Any type of the multi-armed bandit solution model may be used (as will be described below); however, the reward strategy is modified in order to ensure diversity of the displayed content.

For example, the content recommendation application may select, using a multi-armed bandit solution model, a first plurality of content categories based on a reward score of each content category. In some embodiments, the original reward score may be random, uniform, selected by a human curator or based on user preferences of a large number of other users. Once the first plurality of content categories is selected, the content recommendation application may select a first set of recommended content items for the first plurality of content categories. For example, an existing recommendations engine may be used to select content items for each category. The content recommendation application may then generate for display identifiers for recommended content items of the first set of recommended content items.

Once displayed, the content recommendation application tracks user requests for displayed content items. In one approach, once a request is detected, the content recommendation application would reward the category that was actually selected by the user or reward all categories that contain the requested content item. However, such approaches may lead to clustering of categories with similar or identical content. In another approach, the content recommendation application identifies all content categories of the first plurality of content categories that include the requested content item but increases the reward of only the content category of the identified content categories that has the highest reward score (or the category that appeared highest on the screen). In this way, diversification of content categories is incentivized, because if several categories are displayed with the same selected content, only one of these categories is rewarded.

After the reward scores are modified, the content recommendation application selects, using the multi-armed bandit solution model, a second plurality of content categories based on the reward score of each content category. Once the second plurality of content categories is selected, the content recommendation application may select a second set of recommended content items for the second plurality of content categories. The content recommendation application then generates for display identifiers for recommended content items of the first set of recommended content items.

For example, the content recommendation application may generate these identifiers as part of an EPG (electronic programming guide) of a cable system (e.g., Cox™ or Verizon™), or as part of an OTT (over-the-top) media streaming application (e.g., Netflix™ or Amazon™).

In some embodiments, the steps described above may be repeated indefinitely or until a certain end condition is met (e.g., a certain number of repetitions occurred, or the reward scores stopped increasing). During the repetition of the steps, the multi-armed bandit solution model may change its stage (as is common for multi-armed bandit solutions). For example, exploration stage and exploitation stages may be used. In this example, during the exploration stage, the content recommendation application selects the content categories at random only using the reward scores to bias the random choice. When the exploitation stage is reached, the content recommendation application selects content categories strictly based on reward scores to pick the categories that will generate the most views while maintaining diversity.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
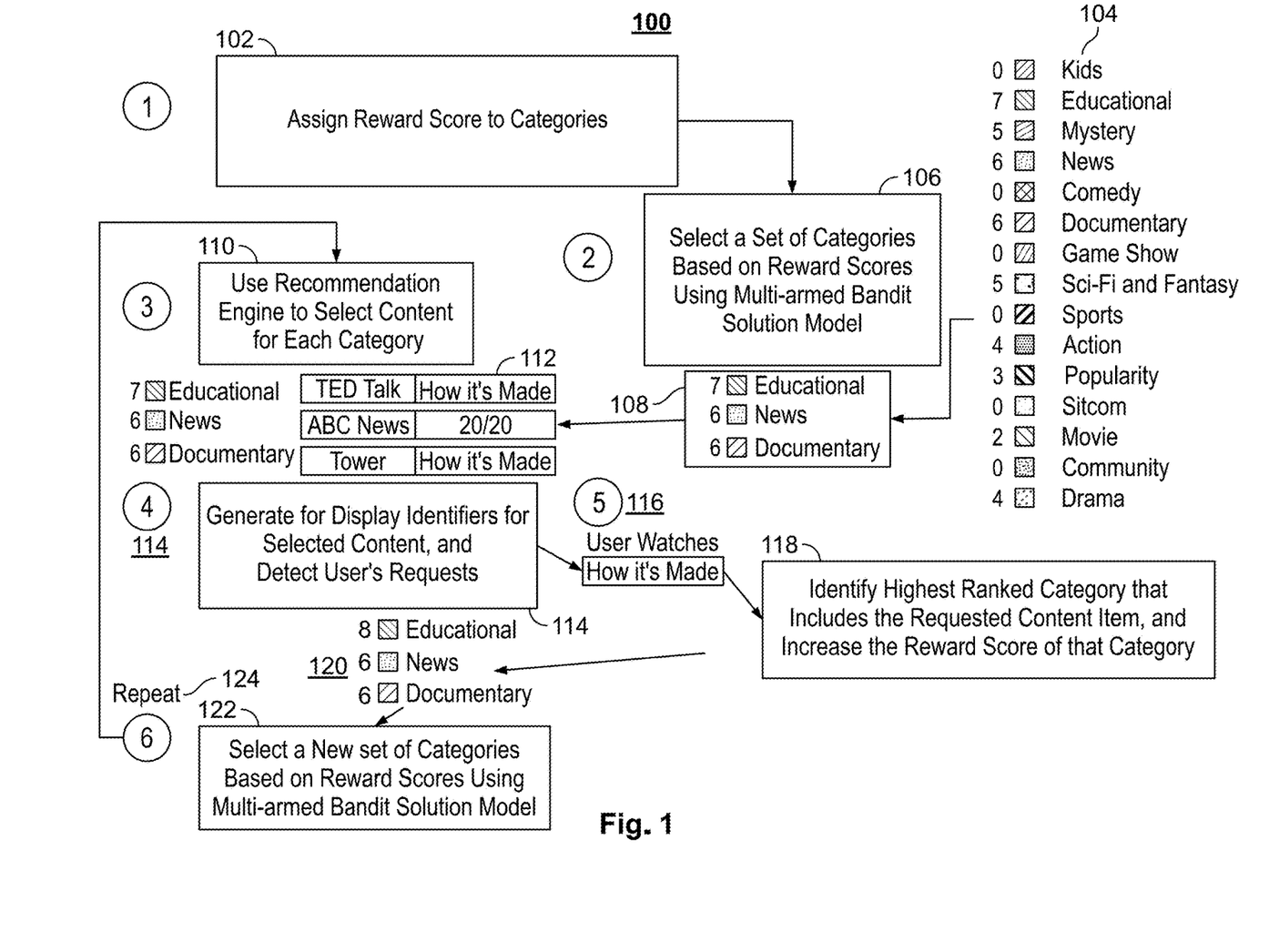
FIG. 1 depicts an illustrative scenario for the content recommendation application providing media content recommendations, in accordance with some embodiments of the disclosure.

FIG. 1 depicts an illustrative scenario 100 for the content recommendation application providing media content recommendations. Media content (or content) may refer to any kind of video, audio, text, multimedia content, application, mobile app, Virtual Reality (VR) app, or any combination thereof. For example, a media content item may be a TV show, a movie, a song, a podcast, a video game, any other type of media or any combination thereof.

At step 102, the content recommendation application assigns reward scores to all available categories 104. For example, the categories may include: "kids," "educational," mystery," "news," and others as depicted in element 104. In some embodiments, the initial scores may be random, or hand-selected by a human curator. In another approach, the initial values may be selected based on popularity of categories among other users. The exemplary reward scores are depicted by element 104. While only fifteen categories are shown, any number may be used. For example, hundreds of very specific categories may be available (e.g., "edgy action movies," or "funny British comedies").

At step 106, the content recommendation application may select, using a multi-armed bandit solution model, a first plurality of content categories based on a reward score of each content category as shown in element 104. The content recommendation application may use any kind of the multi-armed bandit solution model. For example, the content recommendation application may use an optimal solution approach such as asymptotically efficient adaptive allocation rules, or any sub-optimal solution model such epsilon-greedy strategy, epsilon-first strategy, epsilon-decreasing strategy, adaptive epsilon-greedy strategy based on value differences, contextual-epsilon-greedy strategy, etc. These and other the multi-armed bandit solution models are described, for example, in Lai, T. L.; Robbins, H. (1985). "Asymptotically efficient adaptive allocation rules," Advances in Applied Mathematics, and in Honda, J.; Takemura, A. (2011). "An asymptotically optimal policy for finite support models in the multi-armed bandit problem." Machine Learning. 85 (3): 361-391. In particular, the content recommendation application may treat a selection of a category as spending a resource to make a choice, while a content item from the selected category being watched is treated as a factor for increasing the reward score. Then, when a next selection of categories is needed, the multi-armed bandit solution model uses the current reward scores and the state of the multi-armed bandit solution model to make the next selection, where the multi-armed bandit solution model aims to maximize the amount of rewards over time.

In the shown example, the content recommendation application may have selected the following first plurality of categories 108 (along with their reward scores) in step 106 (while only three categories are shown, any number can be selected):

TABLE 1

| Reward Score | Content Category |
| --- | --- |
| 7 | Education |
| 6 | News |
| 6 | Documentary |

At 110, the content recommendation application selects a first set of recommended content items for the first plurality of content categories. For example, the content recommendation application may use an existing recommendation engine to fill in the category with available recommended content items 112. The content recommendation application may use any of the recommendations engines and recommendation techniques as described in U.S. Pat. No. 6,388,714 and in U.S. Pat. No. 6,756,997 (both of which are hereby incorporated by reference herein in their entirety). For example, the content recommendation application may select several content items for each of the categories as depicted in table 112. For example, the content recommendation application may select "Ted Talk" and "How it's made" content items for the Education category, "ABC News" and "20/20" content items for the Education category, and "Tower" and "How it's made" content items for the Documentary category. While only two content items are depicted as being picked, any number of category specific content items may be selected.

At 114, the content recommendation application may generate for display identifiers for recommended content items of the first set of recommended content items. The identifiers may be buttons or icons that include the name of the associated content items. The identifiers may be selectable by the user to watch, record, or otherwise consume the associated content items. For example, the content recommendation application may display the identifiers in a grid, where each row represents content items of the same categories. Such an arrangement may be referred to as a carousel stack, where each row is a "carousel," and a combination of rows is a "stack." For example, content items "Ted Talk" and "How it's made" displayed in a row may be referred to as the "education carousel." In some embodiments, the carousels maybe scrollable to show more items that can fit on the screen. In some embodiments, the carousel stack is shown as the home page of as an OTT application or as EPG for a cable system.

In one embodiment, the content items may be recommended apps or recommended VR apps that are grouped by category. For example, app categories of apps may include "games," "free apps," "trending," "navigation," "productivity." In this way, carousels of apps (e.g., a stack of carousels) may be displayed on a device screen or in virtual reality using any VR technology (e.g., VR goggles.)

In some embodiments, the carousel stack 112 is generated for display to a single user, in which case the multi-armed bandit used in step 106 is maintained specifically for that user. In some embodiments, carousel stack 112 is generated for display to a group of users (e.g., users of the same demographic), in which case the multi-armed bandit used in step 106 is maintained specifically for that group. Additionally, carousel stack 112 may be generated for display to all users, in which case the multi-armed bandit used in step 106 is maintained for all users.

In some embodiments, at 116, the content recommendation application may track requests by a user or a set of users. For example, requests by a single user can be tracked for a week. In another example, requests by a group of user can be tracked for a day. In some embodiments, a group of users (e.g., 1000 users) can be selected for tracking, where the group includes active users (i.e., those who consume media content often) and who belong to the same demographic category (e.g., 18-45 age group). In the case of group tracking, a shorter time period may be used (e.g., one day). While a single show being watched is requested at 116, any number of requests may be received and evaluated during this evaluation time period.

As shown, a user request for the show "how it's made" is received. In a typical approach, this would result in an increase of reward score for the category of the carousel from which the request was received. For example, if the user clicked on the identifier of the show "How it's made" from the documentary carousel, only the reward score for the "documentary" category would be increased. In another approach, all categories of the first plurality of categories that include the content item "How it's made" would receive a reward score increase. For example, both the "documentary" category and the "educational" category would receive a reward score increase. However, such an approach can eventually lead to clustering, where the carousel stack becomes saturated with very similar categories that share a lot of content items.

To overcome this problem, at 118, the content recommendation application identifies all content categories of the first plurality of content categories that include the requested content item but increases the reward score only of the content category of the identified content categories that has the highest reward score (or the category that appeared highest on the screen). In the shown example, both the "documentary" category and the "educational" category include the requested content item "how it's made," but only the "educational" category will receive a reward score increase because it has a current reward score (7) that is higher than the reward score of the "documentary" category (6). In this way, the diversification of categories is encouraged. As a result, the new scores of the categories are

TABLE 2

| Reward Score | Content Category |
|---|---|
| 8 | Education |
| 6 | News |
| 6 | Documentary |

As shown in table 2, the score for the "educational" category was increased by 1 due to the matching request. In some embodiments, a different reward calculation may be used. For example, the reward score increase may be calculated using a "recall value." The recall value may be computed to be proportional to the number of requests for a content item and inversely proportional to the number of times an identifier of that content item was generated for display in a carousel. For example, if the identifier "how it's made" was shown 20 times, but watched only 10 times, the recall value may be ($10/20=1/2$). In this case the reward score for the "educational" category may be increased by a value of "0.5" instead of "1."

At 120, the content recommendation application may select, using the multi-armed bandit solution model, a second plurality of content categories based on updated reward scores of each content category as shown in element 120. The content recommendation application may use any kind of the multi-armed bandit solution model. In particular, the content recommendation application may treat a selection of a category as spending a resource to make a choice, while a content item from the selected category being watched is treated as a factor for increasing the reward score. Then, when a next selection of categories is needed, the multi-armed bandit solution model uses the current reward scores and the state of the multi-armed bandit solution model to make the next selection, where the multi-armed bandit solution model aims to maximize the amount of reward over time.

At this point, since a new set of categories is selected, the content recommendation application may return to step 110 and generate a new carousel stack for display. Steps 110-122 may then be repeated. In some embodiments, the steps are repeated indefinitely to continue refining the selection of categories. In another example, they may be repeated for a set number of cycles or until the reward scores become stable. In some embodiments, while the steps are repeated the multi-armed bandit solution model may transition between stages based on the reward scores and the number of repetitions of the steps. Some examples of the such transitions are described below in connection with FIG. 2.

Figure 2:
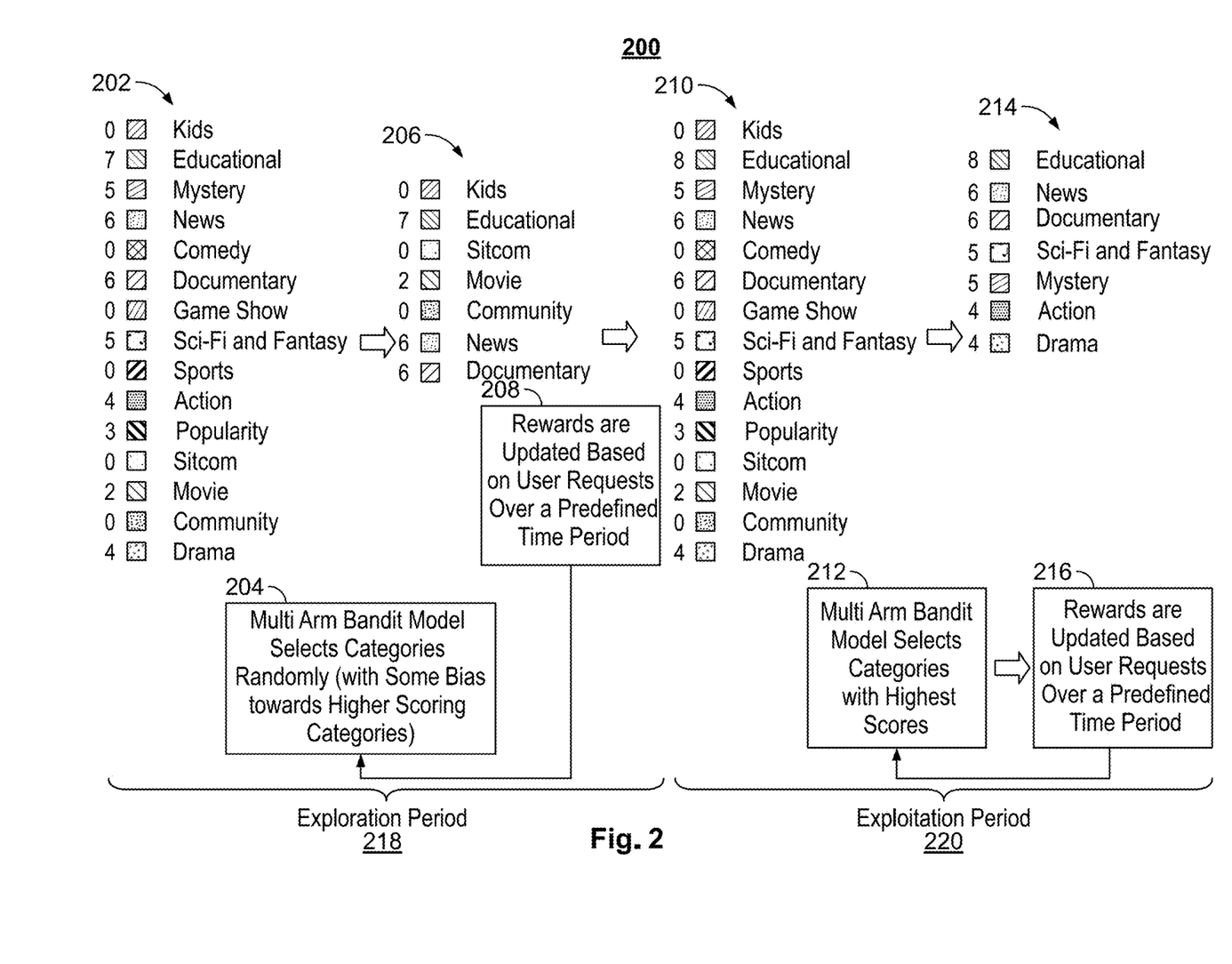
FIG. 2 depicts another illustrative scenario for the content recommendation application providing media content recommendations, in accordance with some embodiments of the disclosure.

FIG. 2 depicts another illustrative scenario 200 for the content recommendation application providing media content recommendations. In particular, FIG. 2 describes an exemplary operation of a multi-armed bandit solution model (e.g., as used in relation FIG. 1). For example, a multi-armed bandit solution model may be a selection algorithm stored by or accessible by the content recommendation application that can select some categories for presentation to a user or users based on current reward scores and the current stage of the multi-armed bandit solution model.

As shown, the content recommendation application is using the multi-armed bandit solution model that utilizes a two-stage approach: an exploration stage 218 and exploitation stage 220. However, the content recommendation application may use any other multi-armed bandit solutions that utilize more stages or switch between stages smoothly.

At 202, the content recommendation application accesses the current reward scores for categories 202. At 204, the content recommendation application uses the multi-armed bandit solution model in its exploration stage to select a subset of categories that are to be displayed as carousels to a user or users. For example, the multi-armed bandit solution model may remain in the exploration stage for a first predetermined number of cycles 110-122 shown in FIG. 1. In another example, the multi-armed bandit solution model may remain in the exploration stage as long as some categories were never selected. In another example, the multi-armed bandit solution model may remain in the exploration stage as long as confidence in reward scores remains low (e.g., when a certain category was shown only a limited number of times).

At 204, the multi-armed bandit solution model selects a subset of categories 206 from set 202 using a random technique. For example, the content recommendation application may select categories completely at random. In another example, the content recommendation application may use a random selection that is biased by the reward score of categories 202 (e.g., a category that has double the score of another category may be twice as likely to be selected). In another embodiment, the content recommendation application may iterate through categories, in a deterministic fashion, e.g., such that all categories are eventually selected (e.g., first 7 categories are selected during the first cycles, next 7 categories are selected during the next cycle, etc.).

At 208, the content recommendation application displays the categories and updates the scores based on watch requests (e.g., as discussed in relation to FIG. 1). Steps 204-208 may be repeated until the multi-armed bandit solution model enters exploitation stage 220.

At 210, the content recommendation application accesses the current reward scores for categories 210 which have changed from scores 202. At 212, the content recommendation application uses the multi-armed bandit solution model in its exploitation stage to select a subset of categories that are to be displayed as carousels to a user or users. For example, the multi-armed bandit solution model may remain in the exploitation stage for a second predetermined number of cycles 110-122 shown in FIG. 1. In another example, the multi-armed bandit solution model may remain in the exploitation stage indefinitely.

At 212, the multi-armed bandit solution model selects a subset of categories 214 from set 210 with a high bias to which category are ranked the highest by their reward scores. For example, the content recommendation application may simply select the highest ranked categories (as shown at 214). In another example, the content recommendation application may use a random selection technique that is highly biased based on the reward scores (e.g., a category that has double the score of another category may be 16 times as likely to be selected). At 216, the content recommendation application displays the categories and updates the scores based on watch requests (e.g., as discussed in relation to FIG. 1). Steps 212-216 may be repeated indefinitely.

In some embodiments, any other multi-armed bandit solution model may be used to select subset of categories. For example, in one implementation Upper Confidence Bound (UCB) other multi-armed bandit solution model may be used by the content recommendation application. For example, UCB solution may be used as described in Garivier et al., "On Upper-Confidence Bound Policies for Non-Stationary Bandit Problems," ALT 2011: Algorithmic Learning Theory, pp 174-188. UCB solution is multi-armed bandit solution model that allows for performing exploitation and exploration together. Using this model, the content recommendation application creates a confidence bound value for each selected category (e.g., in addition to the reward score described above). For example, every time a category is displayed and receives a reward, in addition to increasing the reward score, the confidence bound value is also increased. While if the category is displayed and does not receive a reward (either due to no associated content requested or due to a request reward being assigned to a higher ranked category that has duplicative content), the confidence bound value is also increased may be decreased/

For example, during each iteration of steps 110-122 of FIG. 1, the content recommendation application may track the sum of rewards for each category as described above. The sum of rewards for a category may be expressed as $R_i(n)$, where R is the sum of reward for category I for n iterations. Additionally, $N_i(n)$, is the number of times the category i received the reward for n iterations (e.g., content from the category i was requested, and the reward for that request was assigned to category I, for example because category i was highest ranked or highest displayed category that includes the requested content).

From these two numbers, the content recommendation application may compute an average reward $$\bar{r}_i(n) = \frac{R_i(n)}{N_i(n)}$$

for round n. The content recommendation application may compute the confine interval $[\bar{r}_i(n)-\Delta_i(n), \bar{r}_i(n)+\Delta_i(n)]$ at round n with $$\Delta_i(n) = \sqrt{\frac{3\log(n)}{2N_i(N)}}.$$

Then the content recommendation application may select for display categories i that have the maximum upper confidence bound $\bar{r}_i(n)+\Delta_i(n)$]. The steps may then be repeated as described as above.

Figure 3:
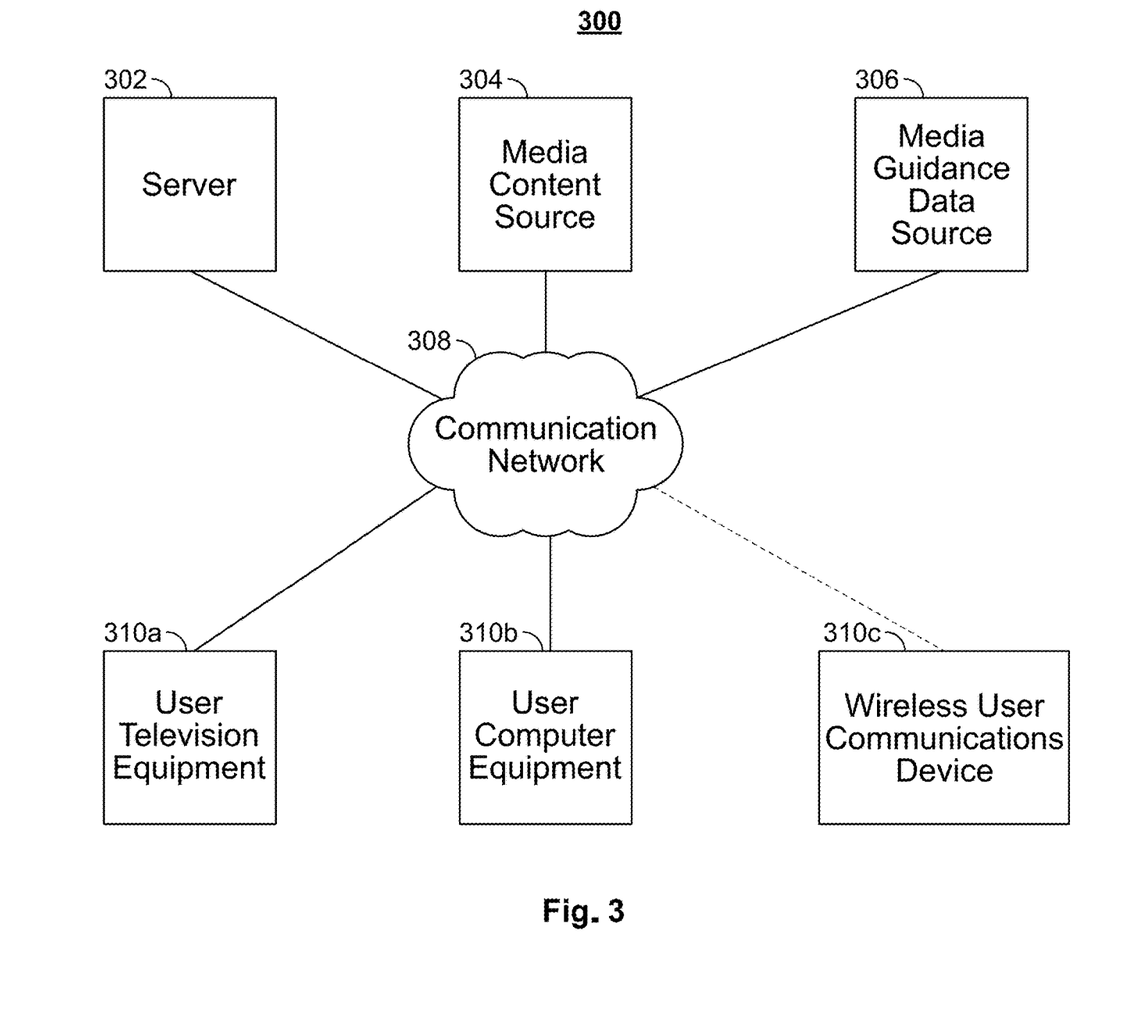
FIG. 3 shows an illustrative block diagram of a system hosting the content recommendation application, in accordance with some embodiments of the disclosure.

FIG. 3 shows an illustrative block diagram of a system 300 for displaying content, in accordance with some embodiments of the disclosure. In various aspects, system 300 includes one or more of server 302, media content source 304, media guidance data source 306, communication network 308, and one or more computing devices 310, such as user television equipment 310a (e.g., a set-top box), user computer equipment 310b (e.g., a laptop), and/or wireless user communications device 310c (e.g., a smartphone device). Although FIG. 3 shows one of each component, in various examples, system 300 may include fewer than the illustrated components and/or multiples of one or more illustrated components. Communication network 308 may be any type of communication network, such as the Internet, a mobile phone network, mobile voice or data network (e.g., a 4G or LTE network), cable network, public switched telephone network, or any combination of two or more of such communication networks. Communication network 308 includes one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. Communication network 308 communicatively couples various components of system 300 to one another. For instance, server 302 may be communicatively coupled to media content source 304, media guidance data source 306, and/or computing device 310 via communication network 308.

In some examples, media content source 304 and media guidance data source 306 may be integrated as one device. Media content source 304 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc.; ABC is a trademark owned by the American Broadcasting Company, Inc.; and HBO is a trademark owned by the Home Box Office, Inc. Media content source 304 may be the originator of content (e.g., a television broadcaster, a Webcast provider, etc.) or may not be the originator of content (e.g., an on-demand content provider, an Internet provider of content of broadcast programs for downloading, etc.). Media content source 304 may include cable sources, satellite providers, on-demand providers, Internet providers, over-the-top content providers, or other providers of content. Media content source 304 may also include a remote media server used to store different types of content (e.g., including video content selected by a user) in a location remote from computing device 310. Systems and methods for remote storage of content and providing remotely stored content to user equipment are discussed in greater detail in connection with Ellis et al., U.S. Pat. No. 7,761,892, issued Jul. 20, 3010, which is hereby incorporated by reference herein in its entirety.

Media content source 304 and media guidance data source 306 may provide content and/or media guidance data to computing device 310 and/or server 302 using any suitable approach. In some embodiments, media guidance data source 306 may provide a stand-alone interactive television program guide that receives program guide data via a data feed (e.g., a continuous feed or trickle feed). In some examples, media guidance data source 306 may provide program schedule data and other guidance data to computing device 310 on a television channel sideband, using an in-band digital signal, an out-of-band digital signal, or any other suitable data transmission technique.

As described in further detail below, server 302 manages the communication of a live content stream (e.g., a live sporting event broadcast, a live news broadcast, or the like) and recorded streams from media content source 304 to computing device 310 via communication network 308. For instance, in some embodiments, content from media content source 304 and/or guidance data from media guidance data source 306 may be provided to computing device 310 using a client/server approach. In such examples, computing device 310 may pull content and/or media guidance data from server 302 and/or server 302 may push content and/or media guidance data to computing device 310. In some embodiments, a client application residing on computing device 310 may initiate sessions with server 302, media content source 304, and/or media guidance data source 306 to obtain content and/or guidance data when needed, e.g., when the guidance data is out of date or when computing device 310 receives a request from the user to receive content or guidance data. In various aspects, server 302 may also be configured to detect events within the live content stream and, based on the detected events, control the display of content and/or navigation menu options via computing device 310. Additionally, although FIG. 3 shows media content source 304 and media guidance data source 306 as separate from server 302, in some embodiments, media content source 304 and/or media guidance data source 306 may be integrated as one device with server 302.

Content and/or media guidance data delivered to computing device 310 may be over-the-top (OTT) content. OTT content delivery allows Internet-enabled user devices, such as computing device 310, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may transfer only IP packets provided by the OTT content provider. Examples of OTT content providers include FACEBOOK, AMAZON, YOUTUBE, NETFLIX, and HULU, which provide audio and video via IP packets. YouTube is a trademark owned by Google LLC; Netflix is a trademark owned by Netflix, Inc.; Hulu is a trademark owned by Hulu, LLC; Facebook is a trademark owned by Facebook, Inc.; and Amazon is a trademark owned by Amazon.com, Inc. OTT content providers may also include any other OTT content provider. OTT content providers may additionally or alternatively provide media guidance data described above. In addition to content and/or media guidance data, providers of OTT content can distribute applications (e.g., web-based applications or cloud-based applications), or the content can be displayed by applications stored on computing device 310.

Figure 4:
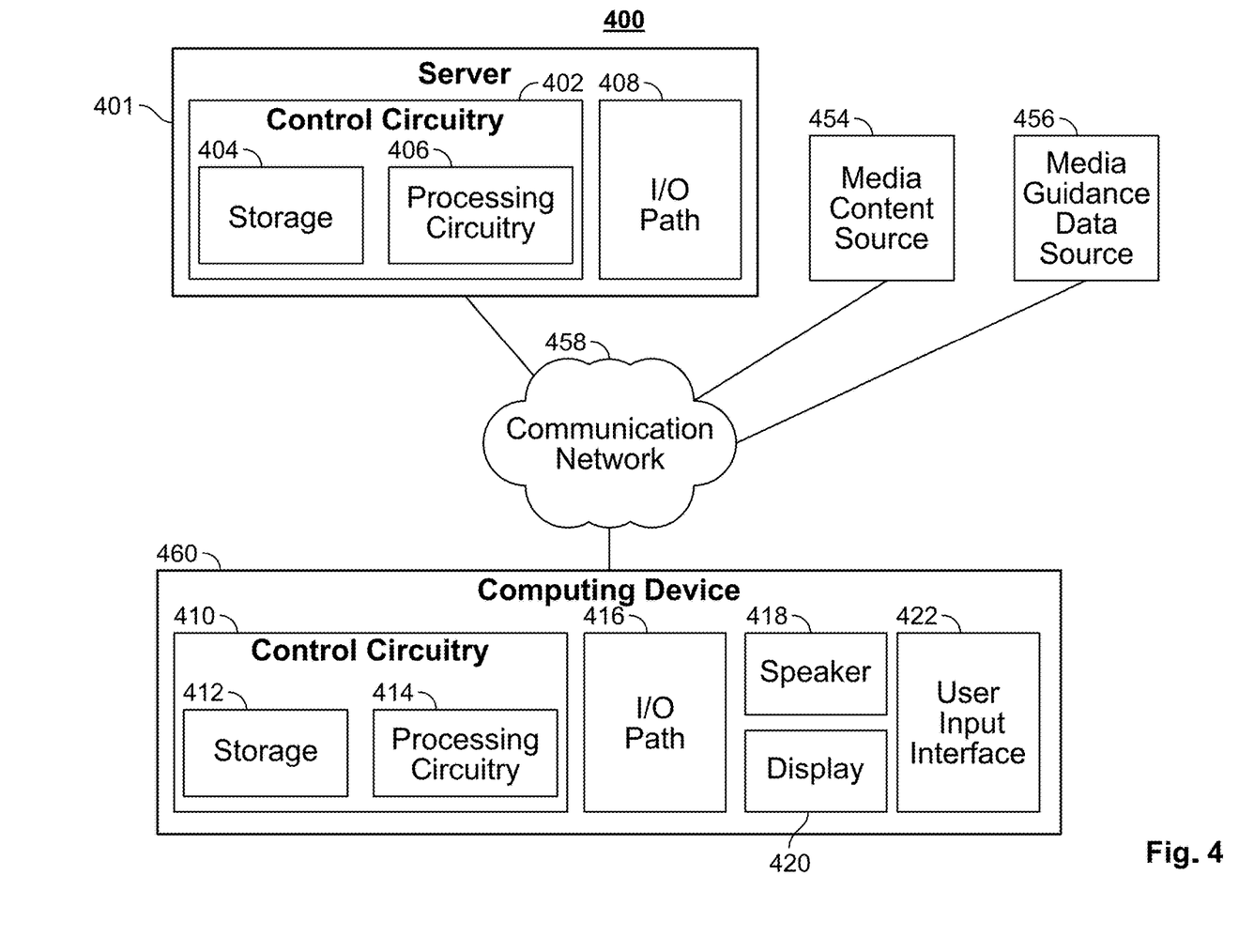
FIG. 4 is an illustrative block diagram showing additional details of a system hosting the content recommendation application, in accordance with some embodiments of the disclosure.

FIG. 4 is an illustrative block diagram showing additional details of the system 400 (which may be the same as system 300 of FIG. 3), in accordance with some embodiments of the disclosure. In particular, server 401 (e.g., the same server as server 302) includes control circuitry 402 and I/O path 408, and control circuitry 402 includes storage 404 and processing circuitry 406. Computing device 460 (e.g., one or more of devices 310a, 310, and 310c) includes control circuitry 410, I/O path 416, speaker 418, display 420 (as well a circuitry for generating images for display on display 420), and user input interface 422. Control circuitry 410 includes storage 412 and processing circuitry 414. Control circuitry 402 and/or 410 may be based on any suitable processing circuitry such as processing circuitry 406 and/or 414. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 404, storage 412, and/or storages of other components of system 400 (e.g., storages of media content source 454, media guidance data source 456, and/or the like) may be an electronic storage device. In some embodiments, media content source 454 may be the same as media content source 304. In some embodiments, media guidance data source 456 may be the same as media content source 306. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called a personal video recorders, or PVRs), solid state devices, quantum storage devices, gaming consoles, gaming media, or any other suitable fixed or removable storage devices, and/or any combination of the same. Each of storage 404, storage 412, and/or storages of other components of system 400 may be used to store various types of content, media guidance data, and or other types of data. Non-volatile memory may also be used (e.g., to launch a boot-up routine and other instructions). Cloud-based storage may be used to supplement storages 404, 412 or instead of storages 404, 412. In some embodiments, control circuitry 402 and/or 410 executes instructions for the content recommendation application stored in memory (e.g., storage 404 and/or 412). Specifically, control circuitry 402 and/or 410 may be instructed by the content recommendation application to perform the functions discussed herein. In some implementations, any action performed by control circuitry 402 and/or 410 may be based on instructions received from the content recommendation application. For example, the content recommendation application may be implemented as software or a set of executable instructions that may be stored in storage 404 and/or 412 and executed by control circuitry 402 and/or 410. In some embodiments, the content recommendation application may be a client/server the content recommendation application where only a client the content recommendation application resides on computing device 460, and a server the content recommendation application resides on server 401.

The content recommendation application may be implemented using any suitable architecture. For example, it may be a stand-alone the content recommendation application wholly implemented on computing device 460. In such an approach, instructions for the content recommendation application are stored locally (e.g., in storage 412), and data for use by the content recommendation application is downloaded on a periodic basis (e.g., from an out-of-band feed, from an Internet resource, or using another suitable approach). Control circuitry 410 may retrieve instructions for the content recommendation application from storage 412 and process the instructions to perform the functionality described herein. Based on the processed instructions, control circuitry 410 may determine what action to perform when input is received from user input interface 422.

In client/server-based embodiments, control circuitry 410 may include communication circuitry suitable for communicating with the content recommendation application server (e.g., server 401) or other networks or servers. The instructions for carrying out the functionality described herein may be stored on the application server. Communication circuitry may include a cable modem, an integrated services digital network (ISDN) modem, a digital subscriber line (DSL) modem, a telephone modem, an Ethernet card, a wireless modem for communication with other equipment, or any other suitable communication circuitry. Such communication may involve the Internet or any other suitable communication networks or paths (e.g., communication network 458). In some embodiments, communication network 458 may be the same as network 308. In another example of a client/server-based application, control circuitry 410 runs a web browser that interprets web pages provided by a remote server (e.g., server 401). For example, the remote server may store the instructions for the application in a storage device. The remote server may process the stored instructions using circuitry (e.g., control circuitry 402) and generate the displays discussed above and below. Computing device 460 may receive the displays generated by the remote server and may display the content of the displays locally via display 420. This way, the processing of the instructions is performed remotely (e.g., by server 401) while the resulting displays, such as the display windows described elsewhere herein, are provided locally on computing device 460. For example, computing device 460 may include display circuitry (e.g., video card circuitry or combination motherboard and video card circuitry) configured to generate for display the display windows. Computing device 460 may receive inputs from the user via input interface 422 and transmit those inputs to the remote server for processing and generating the corresponding displays.

A user may send instructions to control circuitry 402 and/or 410 using user input interface 422. User input interface 422 may be any suitable user interface, such as a remote control, trackball, gamepad, keypad, keyboard, touchscreen, touchpad, stylus input, joystick, voice recognition interface, any kind of VR input interface (e.g., a VR wand, VR gamepad, VR body movement recognition device), or other user input interfaces. User input interface 422 may be integrated with or combined with display 420, which may be a monitor, television, liquid crystal display (LCD), electronic ink display, any kind of VR display (e.g., VR goggles or VR head-mounted display), or any other equipment suitable for displaying visual images.

Server 401 and computing device 460 may receive content and data via input/output (hereinafter "I/O") path 408 and 416, respectively. For instance, I/O path 416 may include circuitry that includes one or more of communication port configured to receive a live content stream from server 401 and/or media content source 454 via a communication network 458. Storage 412 may be configured to buffer the received live content stream for playback, and display 420 may be configured to present the buffered content, navigation options, alerts, and/or the like via a primary display window and/or a secondary display window, and/or VR display. I/O paths 408, 416 may provide content (e.g., a live stream of content, broadcast programming, on-demand programming, Internet content, content available over a local area network (LAN) or wide area network (WAN), and/or other content) and data to control circuitry 402, 410. Control circuitry 402, 410 may be used to send and receive commands, requests, and other suitable data using I/O paths 408, 416. I/O paths 408, 416 may connect control circuitry 402, 410 (and specifically processing circuitry 406, 414) to one or more communication paths (described below). I/O functions may be provided by one or more of these communication paths but are shown as single paths in FIG. 4 to avoid overcomplicating the drawing.

Figure 5:
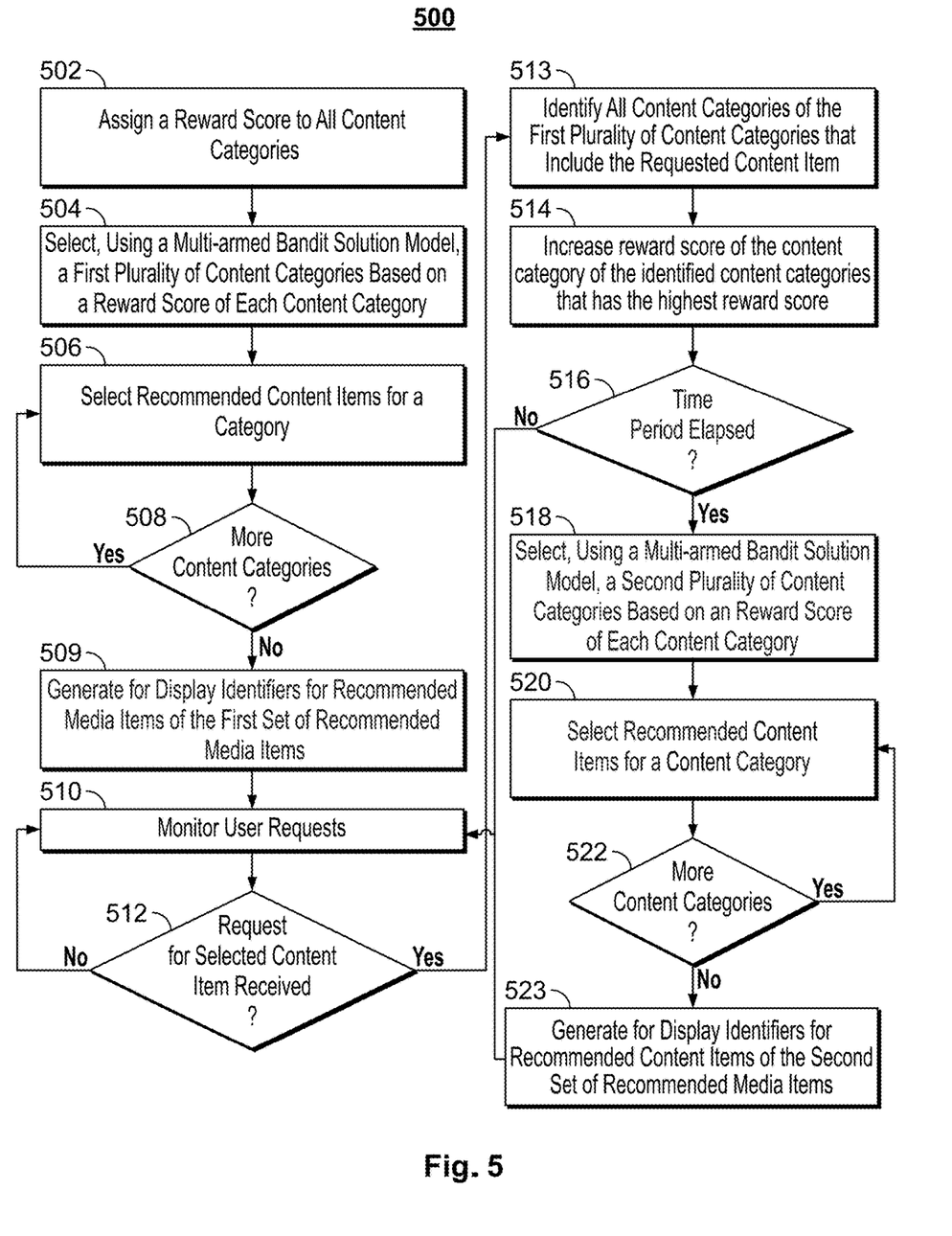
FIG. 5 depicts an illustrative flowchart of a process for providing media content recommendations, in accordance with some embodiments of the disclosure.

Having described systems 300 and 400, reference is now made to FIG. 5, which depicts an illustrative flowchart of process 500 for providing media content recommendations that may be implemented by using systems 300 and 400, in accordance with some embodiments of the disclosure. In various embodiments, the individual steps of process 500 may be implemented by one or more components of systems 300 and 400. Although the present disclosure may describe certain steps of process 500 (and of other processes described herein) as being implemented by certain components of systems 300 and 400, this is for purposes of illustration only, and it should be understood that other components of systems 300 and 400 may implement those steps instead. For example, steps of process 500 may be executed by server 401 and/or by computing device 460 to provide content recommendations.

At step 502, control circuitry 410 either assigns a reward score to all content categories or accesses the reward scores of all content categories. The reward scores may be initially assigned in a variety of ways described in more detail with regards to FIG. 5. For example, an illustrative list of categories and initial reward scores is depicted in element 104 of FIG. 1.

At 504, control circuitry 410 may select, using a multi-armed bandit solution model, a first plurality of content categories based on a reward score of each content category. In some embodiments, the multi-armed bandit solution model may be a history-aware algorithm stored at either storage 412 of device 460 or at storage 404 of server 401. In some embodiments, the multi-armed bandit solution model may be accessed via an API call from computing device 460 to server 401 via network 458. In this case, the server may provide content category selection to computing device 460 via network 458. The multi-armed bandit solution model may be any kind of multi-armed bandit solution algorithm. For example, the multi-armed bandit solution model may be an algorithm configured to operate as described with regards to FIG. 2.

At 506, control circuitry 410 begins to iterate through the first plurality of content categories. For the selected category, control circuitry 410 selects recommended content items. For example, control circuitry 410 may use an existing content recommendation engine to select recommended content items for each category. For example, content recommendation engine may be accessible from server 401 or from media guidance data source 456 via an API. For example, control circuitry 410 may invoke the API call with a user name or user group name and a category name and receive recommended content item identifiers for that category via the API. At 508, control circuitry 410 checks if more categories remain; if so, the process is repeated at 506, otherwise process 500 proceeds to 509.

At 509, control circuitry 410 generates for display (e.g., on display 420) identifiers for recommended media items of the first set of recommended media items. For example, the identifiers may be arranged in a stack of carousels (e.g., as shown in element 112 in FIG. 1). In some embodiments, the stack of carousels may be shown to a single user or to a group of users (e.g., users of a certain demographics category).

At 510, control circuitry 410 may monitor user requests for content items based on displayed identifiers. For example, a user may request a content item by clicking on the identifier using user input interface 422. At 512, control circuitry 410 checks if a request is received; if so, control circuitry 410 proceeds to 513, otherwise control circuitry 410 returns to 510 to continue monitoring.

At 513, control circuitry 410 identifies all content categories of the first plurality of content categories that include the requested content item. For example, if, as shown in FIG. 1, the content item "How it's made" is selected, control circuitry 410 may determine that content categories "documentaries" and "educational" include this content item. At 514, control circuitry 410 increases the reward score of the content category of the identified content categories that has the highest reward score. For example, the reward of the "educational" category is increased (e.g., based on the watch request or based on recall value) because it has the highest reward score. Additionally, when the user selects an identifier, the associated content item may be delivered from media content sources 454 via network 458. In some embodiments, the content item may be generated for display on display 420.

At 516, control circuitry 410 may check if a predetermined time period has elapsed (e.g., 1 day or 1 week). If no, control circuitry 410 returns to 510 and continues to monitor requests. Otherwise, control circuitry 410 proceeds to 518.

At 518, control circuitry 410 may select, using the multi-armed bandit solution model (e.g., an individualized multi-armed bandit solution model for a single user to a group of users), a second plurality of content categories based on an updated reward score of each content category. In some embodiments, the multi-armed bandit solution model may be the same one as used in step 504 via API from server 401 or from media guidance data source 456.

At 520, control circuitry 410 begins to iterate through the second plurality of content categories. For the selected category, control circuitry 410 selects recommended content items. For example, control circuitry 410 may use an existing content recommendation engine to select recommended content items for each category. For example, content recommendation engine may be accessible from server 401 or from media guidance data source 456 via an API. Control circuitry 410 may invoke the API call with a user name or user group name and a category, and receive recommended items for that category via the API. At 522, control circuitry 410 checks if more categories remain; if so, the process is repeated at 520; otherwise process 500 proceeds to 523.

At 523, control circuitry 410 generates for display (e.g., on display 420) identifiers for recommended media items of the first set of recommended media items. For example, the identifiers may be arranged in a stack of carousels (e.g., as shown in element 112 in FIG. 1). In some embodiments, the stack of carousels may be shown to a single user or to a group of users (e.g., users of a certain demographics category). In some embodiments, control circuitry 410 the returns to step 510 and continues repeating steps 509-523. In some embodiments, during the repetition of steps the multi-armed bandit solution model (e.g., individualized multi-armed bandit solution model for a single user or for a group of users) may be updated to keep track of the number of iterations and the history of rewards. Based on these two factors, the multi-armed bandit solution model may transition between stages (e.g., between the exploration and the exploitation stages.) For example, for 10% of the repetitions, the multi-armed bandit solution model may operate in the exploration stage, and then switch to the exploitation stage. In some embodiments, stages and transitions between stages may be accomplished as described in relation to FIG. 2.

Figure 6:
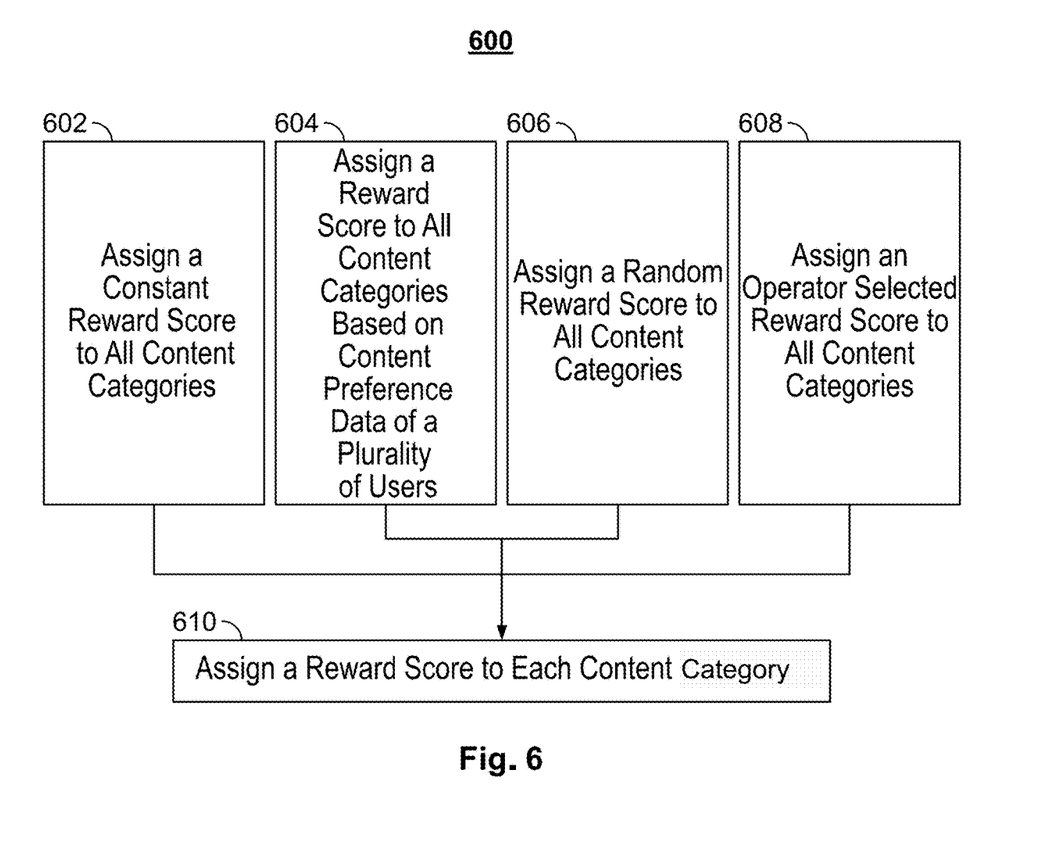
FIG. 6 depicts an illustrative flowchart of a process for assigning reward scores to content categories.

FIG. 6 depicts an illustrative flowchart of process 600 for assigning reward scores to content categories that may be implemented by using systems 300 and 400, in accordance with some embodiments of the disclosure. In various embodiments, individual steps of process 600 may be implemented by one or more components of systems 300 and 400. Although the present disclosure may describe certain steps of process 600 (and of other processes described herein) as being implemented by certain components of systems 300 and 400, this is for purposes of illustration only, and it should be understood that other components of systems 300 and 400 may implement those steps instead. For example, steps of process 600 may be executed by server 401 and/or by computing device 460 to provide content recommendations. In some embodiments, control circuitry 410 may use process 600 as part of process 500 of FIG. 5 (e.g., in addition to or instead of step 502).

In some embodiments, control circuitry 410 may use any one or all of steps 602-608 to assign reward scores to content categories (e.g., for content categories 104 of FIG. 1).

At 602, control circuitry 410 may assig a constant reward score to all content categories. For example, all content categories may start out at zero or at any other number.

At 604, control circuitry 410 may assign a reward score to all content categories based on content preference data of a plurality of users. For example, to initialize an individual multi-armed bandit model for a single user or for a new group of users, control circuitry 410 may leverages a multi-armed bandit model that was developed for all users in general or for a different group of users. In this case, the reward scores (and number of repetitions) are used to set the reward scores for operations of an individualized multi-armed bandit model. In some embodiments, reward scores may be based on general popularity data of the categories. For example, more popular categories may receive higher scores, while less popular categories receive lower scores.

At 606, control circuitry 410 may assign a random reward score to all content categories. For example, a random score between 1 and 10 may be assigned to each category.

At 608, control circuitry 410 may assign an operator-selected reward score to all content categories. For example, control circuitry 410 may receive a reward score for each category as selected by a human curator. For example, a human operator at an OTT service or a broadcast source may manually select categories he or she thinks will be popular.

At 610, control circuitry 410 may assign a reward score to each content category based one of more of the scores from steps 602-608. For example, control circuitry 410 may apply some randomness to scores obtained based on user preference data by averaging scores computed in steps 606 and 608.

Figure 7:
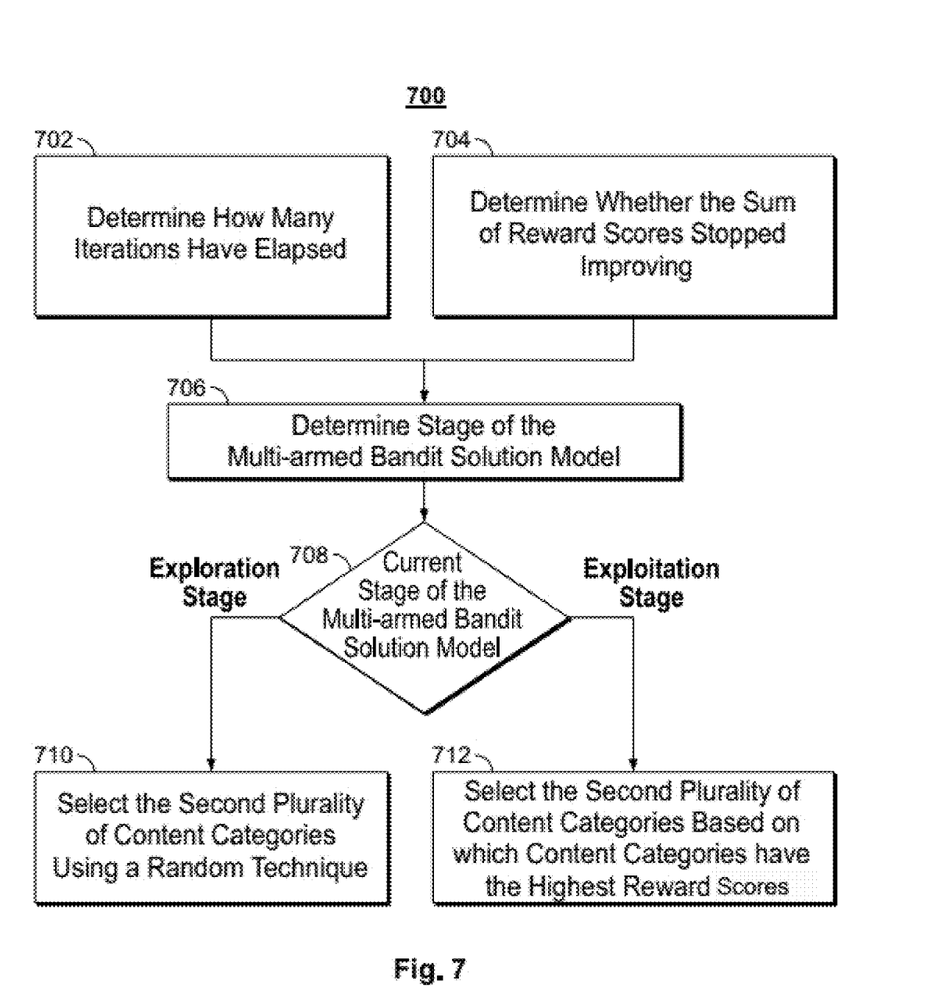
FIG. 7 depicts an illustrative scenario for operating a multi-armed bandit solution model, in accordance with some embodiments of the disclosure.

FIG. 7 depicts an illustrative flowchart of process 700 for operating a multi-armed bandit solution model that may be implemented by using systems 300 and 400, in accordance with some embodiments of the disclosure. In various embodiments, individual steps of process 700 may be implemented by one or more components of systems 300 and 400. Although the present disclosure may describe certain steps of process 700 (and of other processes described herein) as being implemented by certain components of systems 300 and 400, this is for purposes of illustration only, and it should be understood that other components of systems 300 and 400 may implement those steps instead. For example, steps of process 700 may be executed by server 401 and/or by computing device 460 to provide content recommendations. In some embodiments, control circuitry 410 may use process 700 as part of process 500 of FIG. 5 (e.g., in addition to or instead of step 502 and/or 518).

As described above, the multi-armed bandit solution model (e.g., the individualized multi-armed bandit solution model of FIG. 5) may include multiple stages during which it operates differently. To transition between the stages of the multi-armed bandit solution model, control circuitry 410 may perform either one or a combination of steps 702 and 704.

For example, at 702, control circuitry 410 may maintain a counter that tracks how many rounds (e.g., iterations of steps 510-523 of FIG. 5) of selection of content categories have been performed so far. At 704, control circuitry 410 may track the history of the reward scores and track confidence in getting rewards, and track whether the sums of the reward scores of the selected categories keep improving. For example, control circuitry 410 may maintain a history of sums of reward scores and check the trend of the sums over time. When the derivative of the map of sums of reward scores over time becomes negative, zero, or a very low positive number, control circuitry 410 may determine that rewards are no longer improving.

At 706, control circuitry 410 may use the data from 702 and/or from 704 to determine the stage of the of the multi-armed bandit solution model. In some embodiments, control circuitry 410 may determine that the exploration stage should last for a set number of iterations and then switch to the exploitation stage. In some embodiments, control circuitry 410 may switch to exploitation stage when reward scores stop improving. In some embodiments, control circuitry 410 may use a probabilistic scheme where the switch to the exploitation stage becomes more likely the higher then number of interactions have occurred and more likely as the sums of the reward scores stop increasing.

At 708, control circuitry 410 may check what the current stage of the multi-armed bandit solution model currently is. If the multi-armed bandit solution model is in the exploration stage, control circuitry 410 proceeds to 710. If the multi-armed bandit solution model is in the exploitation stage, control circuitry 410 proceeds to 712.

At 710, the multi-armed bandit solution model is used to select the second plurality of content categories using a random technique (e.g., in step 518). For example, categories are selected either at random, or at random but with a small bias for reward scores.

At 710, the multi-armed bandit solution model is used to select the second plurality of content categories based on which content categories have the highest reward scores (e.g., in step 518). For example, categories are selected purely on which categories have the highest reward scores. In some embodiments, some small degree of randomness is introduced. For example, instead of selection at 100% rate, categories can be chosen at a 99% rate or at a 95% rate.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for selecting content item identifiers for display to a user, the method comprising:
(a) selecting, using a multi-armed bandit solution model, a first plurality of content categories based on a reward score of each content category;
(b) selecting a first set of recommended content items for the first plurality of content categories based on demographical data of the user;
(c) generating for display identifiers for recommended content items of the first set of recommended content items;
(d) receiving a request for a content item associated with one of the displayed identifiers;
(e) identifying multiple content categories of the first plurality of content categories that include the content item;
(f) only increasing reward score of the content category of the multiple identified content categories that has the highest reward score, wherein reward scores of other content categories of the multiple identified content categories are not increased;
(g) selecting, using the multi-armed bandit solution model, a second plurality of content categories based on the reward score of each content category;
(h) selecting a second set of recommended content items for the second plurality of content categories based on demographical data of the user; and
(i) generating for display identifiers for recommended content items of the second set of recommended content items.

2. The method of claim 1, further comprising repeating the steps (d)-(i).

3. The method of claim 2, wherein selecting, using the multi-armed bandit solution model, a second plurality of content categories based on the reward score of each content category comprises:
selecting the second plurality of content categories using a random technique during an exploration stage of the multi-armed bandit solution model; and
selecting the second plurality of content categories based on which content categories have the highest reward scores during an exploitation stage of the armed bandit solution model.

4. The method of claim 3, further comprising switching the multi-armed bandit solution model to the exploitation stage based on the number of times steps (d)-(i) have been repeated.

5. The method of claim 3, further comprising switching the multi-armed bandit solution model to the exploitation stage based on determining that sum of reward scores of the second plurality of content categories stopped improving.

6. The method of claim 3, wherein the multi-armed bandit solution model is specific to a single user, and wherein all requests for the content item are received from the single user.

7. The method of claim 3, wherein the multi-armed bandit solution model is specific to a user group, and wherein all requests for the content item are received from a user of the user group.

8. The method of claim 1, further comprising:
prior to step (a), assigning a reward score to all content categories based on content preference data of a plurality of users.

9. The method of claim 1, further comprising:
prior to step (a), assigning a random reward score to all content categories.

10. The method of claim 1, wherein increasing the reward score of only the identified content category with the highest reward score comprises:
calculating a recall value for the content item, wherein the reward scores is proportional to the number of times the content item was requested and inversely proportional the number of times the identifier of the content item was generated for display; and
and increasing the reward score based on the recall value.

11. A system for selecting content item identifiers for display to a user, the system comprising:
control circuitry configured to:
(a) select, using a multi-armed bandit solution model, a first plurality of content categories based on a reward score of each content category;
(b) select a first set of recommended content items for the first plurality of content categories based on demographical data of the user;
(c) generate for display identifiers for recommended content items of the first set of recommended content items;
(d) receive a request for a content item associated with one of the displayed identifiers;
(e) identify multiple content categories of the first plurality of content categories that include the content item;
(f) only increase reward score of the content category of the identified content categories that has the highest reward score, wherein reward scores of other content categories of the multiple identified content categories are not increased;
(g) select, using the multi-armed bandit solution model, a second plurality of content categories based on the reward score of each content category;
(h) select a second set of recommended content items for the second plurality of content categories based on demographical data of the user; and
(i) generate for display identifiers for recommended content items of the second set of recommended content items.

12. The system of claim 11, wherein the control circuitry is further configured to repeat the steps (d)-(i).

13. The system of claim 12, wherein the control circuitry is further configured to select, using the multi-armed bandit solution model, a second plurality of content categories based on the reward score of each content category, by:
selecting the second plurality of content categories using a random technique during an exploration stage of the multi-armed bandit solution model; and
selecting the second plurality of content categories based on which content categories have the highest reward scores during an exploitation stage of the armed bandit solution model.

14. The system of claim 13, wherein the control circuitry is further configured to switch the multi-armed bandit solution model to the exploitation stage based on the number of times steps (d)-(i) have been repeated.

15. The system of claim 13, wherein the control circuitry is further configured to switch the multi-armed bandit solution model to the exploitation stage based on determining that sum of reward scores of the second plurality of content categories stopped improving.

16. The system of claim 13, wherein the multi-armed bandit solution model is specific to a single user, and wherein all requests for the content item are received from the single user.

17. The system of claim 13, wherein the multi-armed bandit solution model is specific to a user group, and wherein all requests for the content item are received from a user of the user group.

18. The system of claim 11, wherein the control circuitry is further configured to:
prior to step (a), assign a reward score to all content categories based on content preference data of a plurality of users.

19. The system of claim 11, wherein the control circuitry is further configured to:
prior to step (a), assign a random reward score to all content categories.

20. The system of claim 11, wherein the control circuitry is further configured to increase the reward score of the identified content category with the highest reward score by:
calculating a recall value for the content item, wherein the reward score is proportional to the number of times the content item was requested and inversely proportional the number of times the identifier of the content item was generated for display; and
and increasing the reward score based on the recall value.

* * * * *